(12) United States Patent
Foster et al.

(10) Patent No.: US 10,516,567 B2
(45) Date of Patent: Dec. 24, 2019

(54) IDENTIFICATION OF VULNERABILITY TO SOCIAL PHISHING

(71) Applicant: ZeroFOX, Inc., Baltimore, MD (US)

(72) Inventors: James Foster, Baltimore, MD (US); Evan Blair, Baltimore, MD (US); Christopher B. Cullison, Westminster, MD (US); Robert Francis, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

(21) Appl. No.: 15/207,052

(22) Filed: Jul. 11, 2016

(65) Prior Publication Data
US 2017/0013014 A1    Jan. 12, 2017

Related U.S. Application Data

(60) Provisional application No. 62/191,117, filed on Jul. 10, 2015.

(51) Int. Cl.
*H04L 12/24* (2006.01)
*H04L 12/26* (2006.01)
*H04L 29/08* (2006.01)
*H04L 29/06* (2006.01)

(52) U.S. Cl.
CPC ........ *H04L 41/0686* (2013.01); *H04L 43/062* (2013.01); *H04L 63/1433* (2013.01); *H04L 67/02* (2013.01); *H04L 67/146* (2013.01)

(58) Field of Classification Search
CPC ............. H04L 63/1416; H04L 63/0281; H04L 63/0876; H04L 63/1425; H04L 63/20; H04L 63/1433; H04L 41/0686; H04L 43/062; H04L 67/02; H04L 67/146
See application file for complete search history.

(56) References Cited

U.S. PATENT DOCUMENTS

| | | |
|---|---|---|
| 8,087,084 B1 | 12/2011 | Andruss et al. |
| 8,225,413 B1 | 7/2012 | De et al. |
| 8,234,168 B1 | 7/2012 | Lagle Ruiz et al. |
| 8,347,381 B1 * | 1/2013 | Gauvin ............... G06Q 10/10 726/22 |
| 8,484,744 B1 | 7/2013 | De et al. |
| 8,635,703 B1 * | 1/2014 | Belani ............... H04L 63/1433 726/22 |

(Continued)

FOREIGN PATENT DOCUMENTS

CN    102662950    9/2012

OTHER PUBLICATIONS

Notice of Allowance issued in U.S. Appl. No. 14/445,203 dated Feb. 11, 2015, 7 pages.

(Continued)

*Primary Examiner* — Mohammed Waliullah
(74) *Attorney, Agent, or Firm* — DLA Piper LLP (US)

(57) ABSTRACT

A computer-implemented method includes generating, by one or more processors, a hyperlink targeting a Uniform Resource Locator (URL), detecting a selection of the generated hyperlink by one or more social entities across one or more social networks, generating a report, wherein the generated report includes analytical details regarding the selection of the generated hyperlink by the one or more social entities, and providing the generated report to a user associated with a protected social entity.

15 Claims, 8 Drawing Sheets

(56) References Cited

U.S. PATENT DOCUMENTS

| | | | |
|---|---|---|---|
| 8,655,899 B2 | 2/2014 | Kennedy et al. | |
| 8,732,455 B2 | 5/2014 | Wong et al. | |
| 8,782,080 B2 | 7/2014 | Lee et al. | |
| 8,782,217 B1 | 7/2014 | Arone | |
| 8,909,646 B1 | 12/2014 | Fabrikant et al. | |
| 9,027,134 B2 | 5/2015 | Foster et al. | |
| 9,055,097 B1 | 6/2015 | Foster et al. | |
| 9,070,088 B1 | 6/2015 | Baveja | |
| 2002/0073086 A1 | 6/2002 | Thompson et al. | |
| 2005/0198031 A1 | 9/2005 | Pezaris | |
| 2006/0168066 A1 | 7/2006 | Helsper et al. | |
| 2007/0245422 A1* | 10/2007 | Hwang | G06F 21/31 726/26 |
| 2008/0103800 A1 | 5/2008 | Domenikos | |
| 2008/0177834 A1 | 7/2008 | Gruhl et al. | |
| 2008/0196099 A1 | 8/2008 | Shastri | |
| 2008/0262877 A1 | 10/2008 | Hagroder | |
| 2008/0288330 A1* | 11/2008 | Hildebrand | G06Q 10/06 705/7.28 |
| 2008/0288382 A1 | 11/2008 | Smith et al. | |
| 2008/0300964 A1 | 12/2008 | Raghunandan | |
| 2009/0006230 A1 | 1/2009 | Lyda | |
| 2010/0138925 A1* | 6/2010 | Barai | H04L 63/1433 726/25 |
| 2010/0174813 A1 | 7/2010 | Hildreth et al. | |
| 2010/0241621 A1 | 9/2010 | Randall | |
| 2010/0306834 A1 | 12/2010 | Grandison | |
| 2011/0131122 A1 | 6/2011 | Griffin | |
| 2011/0145279 A1 | 6/2011 | Chunilal | |
| 2011/0167011 A1 | 7/2011 | Paltenghe | |
| 2011/0191200 A1 | 8/2011 | Bayer et al. | |
| 2011/0276396 A1 | 11/2011 | Rathod | |
| 2012/0030732 A1 | 2/2012 | Shaty | |
| 2012/0047560 A1 | 2/2012 | Underwood et al. | |
| 2012/0047581 A1 | 2/2012 | Banerjee et al. | |
| 2012/0159647 A1 | 6/2012 | Sanin et al. | |
| 2012/0167231 A1 | 6/2012 | Garcia et al. | |
| 2012/0180135 A1 | 7/2012 | Hodges | |
| 2012/0191594 A1 | 7/2012 | Welch et al. | |
| 2012/0203590 A1* | 8/2012 | Deb | G06Q 10/04 705/7.28 |
| 2012/0296845 A1 | 11/2012 | Andrews et al. | |
| 2012/0296965 A1 | 11/2012 | Srivasta | |
| 2013/0085953 A1 | 4/2013 | Bhola | |
| 2013/0110802 A1 | 5/2013 | Shenoy et al. | |
| 2013/0124538 A1 | 5/2013 | Lee et al. | |
| 2013/0139236 A1 | 5/2013 | Rubenstein et al. | |
| 2013/0151609 A1 | 6/2013 | Rubenstein | |
| 2013/0239217 A1* | 9/2013 | Kindler | G06F 17/30958 726/25 |
| 2013/0268357 A1 | 10/2013 | Heath | |
| 2013/0318631 A1 | 11/2013 | Lansford | |
| 2013/0339186 A1 | 12/2013 | French et al. | |
| 2014/0067656 A1 | 3/2014 | Cohen Ganor et al. | |
| 2014/0123632 A1 | 5/2014 | Shibuya et al. | |
| 2014/0129632 A1 | 5/2014 | Sutton et al. | |
| 2014/0129942 A1 | 5/2014 | Rathod | |
| 2014/0137257 A1 | 5/2014 | Martinez et al. | |
| 2014/0208424 A1 | 7/2014 | Hudack et al. | |
| 2014/0317736 A1 | 10/2014 | Cao | |
| 2014/0325662 A1 | 10/2014 | Foster et al. | |
| 2014/0337972 A1 | 11/2014 | Foster et al. | |
| 2014/0337973 A1 | 11/2014 | Foster et al. | |
| 2015/0188941 A1 | 7/2015 | Boshmaf | |
| 2015/0222657 A1* | 8/2015 | Chu | G06F 21/128 726/23 |
| 2015/0310205 A1* | 10/2015 | Pruthi | G06F 21/46 726/25 |
| 2016/0308897 A1* | 10/2016 | Chapman | G06F 3/04842 |

OTHER PUBLICATIONS

Office Action issued in U.S. Appl. No. 13/842,716 dated Aug. 13, 2014, 12 pages.
Office Action issued in U.S. Appl. No. 13/842,716 dated Mar. 23, 2015, 22 pages.
Office Action issued in U.S. Appl. No. 14/218,522 dated Dec. 31, 2014, 13 pages.
Office Action issued in U.S. Appl. No. 14/218,522 dated Jul. 8, 2014, 10 pages.
Office Action issued in U.S. Appl. No. 14/327,068 dated Aug. 12, 2014, 12 pages.
Office Action issued in U.S. Appl. No. 14/327,068 dated Jan. 26, 2015, 18 pages.
Office Action issued in U.S. Appl. No. 14/327,068 dated May 22, 2015, 22 pages.
Office Action issued in U.S. Appl. No. 14/445,203 dated Sep. 18, 2014, 8 pages.
Office Action issued in U.S. Appl. No. 14/445,274 dated Apr. 27, 2015, 18 pages.
Office Action issued in U.S. Appl. No. 14/445,274 dated Sep. 11, 2014, 11 pages.
Office Action issued in U.S. Appl. No. 14/566,971 dated May 29, 2015, 18 pages.
Office Action issued in U.S. Appl. No. 14/566,971 dated Feb. 13, 2015, 23 pages.
Office Action issued in U.S. Appl. No. 14/690,804 dated Aug. 27, 2015, 34 pages.
Office Action issued in U.S. Appl. No. 14/445,274 dated Sep. 11, 2015, 16 pages.
Office Action issued in U.S. Appl. No. 13/842,716 dated Oct. 1, 2015, 20 pages.
Office Action issued in U.S. Appl. No. 14/690,677 dated Oct. 8, 2015, 26 pages.
Office Action issued in U.S. Appl. No. 14/566,971 dated Nov. 4, 2015, 12 pages.
Kontaxis et al., "Detecting Social Network Profile Cloning" http://ieeexplore.ieee.org/stamp/stamp.jsp?tp=&arnumber=5766886&tag=1, pp. 295-300, 2011.
Liu et al., "A Framework for Computing the Privacy Scores of Users in Online Social Networking," http://cs-people.bu.edu/evimaria/papers/tkdd-pr.pdf, Dec. 2010, pp. 1-30.
Tchuente et al., "A Community Based Algorithm for Deriving Users' Profiles from Egocentrics Networks" http://ieeexplore.ieee.org/stamp/stamp.jsp?tp=&arnumber=6425752i, 2012, pp. 266-273, 2012.
"How do I report a fake account that's pretending to be me?," Dec. 2012, Retrieved from the Internet <URL: web.archive.org/web/20121226111810/https://www.facebook.com/help/174210519303259>, Retrieved on Aug. 12, 2015, 1 page.
Socialimpostor.com, May 2012; Retrieved from the Internet < URL: web.archive.org/web/20120504213219/http://www.socialimpotor.com/>, Retrieved on Aug. 12, 2015, 3 pages.
Office Action issued in U.S. Appl. No. 14/445,274 dated Jan. 21, 2016, 17 pages.
Office Action issued in U.S. Appl. No. 14/690,804 dated Mar. 11, 2016, 18 pages.
Office Action issued in U.S. Appl. No. 14/690,677 dated Mar. 15, 2016, 18 pages.
Office Action issued in U.S. Appl. No. 14/566,971 dated Mar. 25, 2016, 16 pages.
Office Action issued in U.S. Appl. No. 13/842,716 dated Apr. 26, 2016, 26 pages.
Office Action issued in U.S. Appl. No. 14/690,804 dated Jun. 17, 2016, 19 pages.
Office Action issued in U.S. Appl. No. 14/690,677 dated Jun. 29, 2016, 17 pages.
Office Action issued in U.S. Appl. No. 14/445,274 dated Jun. 30, 2016, 19 pages.
Notice of Allowance issued in U.S. Appl. No. 14/566,971 dated Oct. 28, 2016, 11 pages.
Office Action issued in U.S. Appl. No. 14/445,274, dated Mar. 17, 2017, 11 pages.
Office Action issued in U.S. Appl. No. 14/445,274, dated Oct. 5, 2017, 11 pages.

* cited by examiner

IDENTIFICATION OF VULNERABILITY TO SOCIAL PHISHING

CROSS-REFERENCE TO RELATED APPLICATION

This application claims benefit of U.S. Provisional Application No. 62/191,117, filed Jul. 10, 2015, and titled "Identification of Vulnerability to Social Phishing," which is incorporated by reference in its entirety.

FIELD

The present application relates to computer security.

BACKGROUND

Traditional approaches to combating cyber threats focus on securing endpoints and networks through reactive security measures that are focused on securing computing devices. Anti-virus programs, for example, can be used to detect malicious software associated with local system-level attacks (e.g., a virus attached to an email) and, when defenses have already been breached, to quarantine dangerous files that are detected within a computer system. Firewalls and other edge security devices can be used to establish a perimeter around sensitive systems by controlling the passage of information between networks, so as to reduce the risk of unauthorized access.

Modern cyber threats, however, evolve alongside computer technology, and attackers can be expected to leverage whatever means are available in order compromise or bypass traditional defenses. The development and expansion of social media, for instance, has introduced significant information security risk to both individuals and organizations. These risks include targeted social-based cyber-attacks (e.g phishing attempts), fraud, impersonations, and social engineering. The evolving risk necessitates security technology that is predictive rather than reactive in nature, and that identifies dormant maliciously-minded entities before they can initiate an attack.

SUMMARY

In one aspect, a hyperlink targeting a Uniform Resource Locator (URL) is generated, and a selection of the generated hyperlink by one or more social entities across one or more social networks is detected. A report is generated, where the report may include analytical details regarding the selection of the generated hyperlink by the one or more social entities. The generated report is provided to a user associated with a protected social entity.

In another aspect, the generated hyperlink is communicated to the one or more social entities. In a further aspect, data maintained on one or more social networks is scanned, where scanning data that is maintained on one or more social networks may include identifying, by one or more processors, data that is associated with the one or more social entities. The scanning of data maintained on the one or more social networks is performed on a continuous basis, and may be performed without user initiation. The selection of the generated hyperlink by one or more social entities may be detected during scanning.

In yet another aspect, the generated report may indicate a probability of one or more users associated with the protected social entity selecting the generated hyperlink. In one aspect, the text of the hyperlink may be associated with a hashtag.

In yet another aspect, the protected social entity may be an organization or an individual. The resource targeted by the generated hyperlink may provide fictitious information. The resource targeted by the generated URL may indicate that it is related to a trusted social entity. The resource targeted by the generated URL may solicit information from one or more social entities.

In one aspect, an alert is generated based on the detection of the selection of the generated hyperlink by one or more social entities, and the alert is provided to the user associated with the protected social entity. Providing the alert to the user associated with the protected social entity may include providing a computer-based alert.

Other implementations of these aspects include corresponding systems, apparatus, and computer programs, configured to perform the described techniques, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

Predictive and active social risk management technology reduces the risks posed to individuals and enterprises by cyber threats that target and exploit the social vector. Traditional approaches to combating cyber threats focus on endpoint and perimeter security, providing reactive protection through, for example, anti-virus software, email and web gateways, firewalls, and intrusion detection systems. Cyber threats have evolved, however, and attacks now leverage social network and social media communications as means of bypassing traditional protections. The evolving risk necessitates security technology that is predictive and active rather than reactive in nature, and that identifies dormant malicious entities before they can launch an attack.

In more detail, an active social risk defense engine that identifies live attacks can be paired with a predictive analysis framework that identifies dormant risks before attacks occur. The predictive analysis framework can be driven by a scoring algorithm that can determine and score a risk posed by a social entity by analyzing characteristics of a target URL, file, or social communication that is associated with the social entity. The framework can analyze the target via a variety of analytical factors, and can dynamically determine which factors to employ, where each factor employed by the algorithm is associated with one or more characteristics of the target and/or social entity. Based on the result of analysis, the algorithm can score the risk posed by the social entity, and can recommend or take appropriate security action based on a comparison of the social risk score to a social risk threshold.

The active social risk defense engine can work in conjunction with a phishing engine to determine susceptibility to phishing attempts. The phishing engine may, for example, track how likely social entities across multiple different social networks are to click on links on the social networks. The phishing engine can also determine how likely it is that one or more social entities communicate with other unknown social entities, or accept a friend request from unknown social entities. The phishing engine can launch benign links, and can track the one or more social entities that click on the links. The phishing engine can use this data to determine how likely social entities are to click on links on social media networks, and can determine a vulnerability score for a protected social entity. The vulnerability score for the protected social entity may assess susceptibility to a security breach across multiple dimensions. Based on the assessment of the vulnerability, the phishing engine can recommend changes that will improve the security of a protected social entity.

In more detail, a vulnerability score measures how susceptible a protected social entity is to security threats. In some instances, where the protected social entity is a corporation, the vulnerability score assesses the likelihood that the protected social entity may be affected by security threats based on activities of one or more employees of the corporation on one or more social networks. The phishing engine 110 may track the activities of the one or more employees associated with a protected corporation. The tracking of the one or more employees may be based on the phishing engine 110 detecting that the one or more employees of the corporation click on unknown hyperlinks. These unknown links may be benign hyperlinks generated by the phishing engine 110. In some examples, the links generated by the phishing engine may be a link requesting communication with the employee. In some other examples, the hyperlink may be a link to a post to share on a social network profile of the employee. The link may, in some examples be a hashtag associated with a post by another social entity. The phishing engine may use the selection tracking data, such as, the number of times a hyperlink is selected, or the probability that an employee selects the hyperlink to assess how likely the one or more employees are to selecting other unknown hyperlinks across one or more social networks that are not posted by the phishing engine, and in turn assess how vulnerable the corporation is to security threats through social network platforms.

Figure 1:
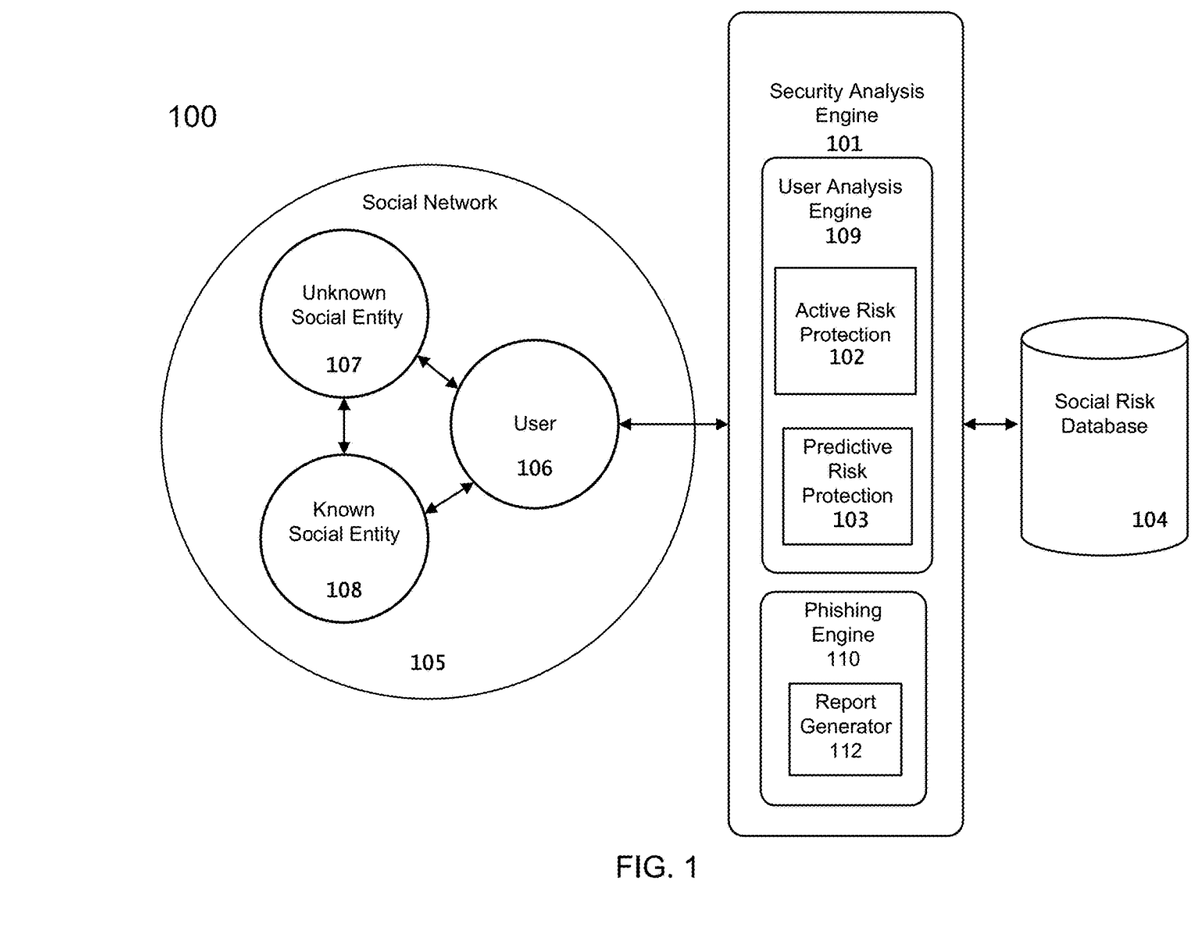
FIG. 1 is a diagram of an example of a system that identifies a social entity's vulnerability to phishing.

FIG. 1 is a diagram of an example of a system that identifies a social entity's vulnerability to social network security threats. The system 100 includes a security analysis engine 101 that includes a user analysis engine 109, a phishing engine 110, and a social risk database 104. The user analysis engine 109 includes an active risk protection module 102 and a predictive risk protection module 103. The phishing engine includes a report generator 112. The security analysis engine 101, the user analysis engine 109, and the social risk database 104 may be used to provide security against risks arising from social network 105, such as risks posed to a user 106 by unknown social entity 107 and/or known social entity 108. The phishing engine 110 may be used to provide a protected social entity with a report that indicates the social entity's vulnerability to security threats, including, phishing, impersonations, hashtag hijacking, and any other suitable security threats. Security analysis engine 101, social risk database 104, and user 106 may be connected through a network, such as the Internet, and user 106, unknown social entity 107 and known social entity 108 may communicate or may otherwise be connected through social network 105. The active risk protection module 102 and the predictive risk protection module 103 of the user analysis engine 109 may be implemented using a single computer, or may instead be implemented using two or more computers that interface through the network. Similarly, security analysis engine 101 and social risk database 104 may be implemented using a single computer, or may instead be implemented using two or more computers that interface through the network. In some implementations, the user analysis engine 109 may be implemented on a separate computer that is in communication through the network to the security analysis engine 101. In some implementations, the phishing engine 110 may be implemented on a separate computer that is in communication through the network to the security analysis engine 101.

Active risk protection module 102 of user analysis engine 109 may be used to protect user 106 from immediate security risks by, for example, thwarting live attacks. In more detail, either of unknown social entity 107 or known social entity 108 may attempt to communicate with, or connect to, user 106. In response to an attempt by a social entity at communication or connection with user 106, active risk protection module 102 may identify a URL, file, or social communication associated with the social entity, and may initiate a security action after performing an analysis related to the identified URL, file, or social communication.

In more detail, Uniform Resource Locators function as addresses that are used, for example, to specify the location of documents on the World Wide Web. An individual URL, which may be referred to as a web address, is a specific character string that references (i.e. provides the location of) a resource. For example, http://zerofox.com references the homepage of ZeroFOX, a cyber-security technology company. Risk protection module 102 may identify an association between a social entity and a URL when, for example, the source of the URL is a social communication originating with the social entity, or when the URL references a social network profile of the social entity. A social communication may be, for example, a post on a social network, or a message sent between users of a social network.

Risk protection module 102 may determine, based on the URL associated with the social entity attempting to connect to or communicate with user 106, that the social entity is a known entity, such as known social entity 108. The determination may involve, for example, identifying an entry in social risk database 104 that is associated with the social entity, the entry including the URL and a social risk score for the social entity. Alternatively, risk protection module 102 may determine, based on, for example, an absence of an entry associated with the social entry in social risk database 104, that the social entity is an unknown entity, such as unknown social entity 107. The determination may involve, for example, identifying an identity as a known entity only for a specific period of time. Prior to the expiration of the specified period of time, a social entity that was scanned and identified as a known entity will be considered to be a known entity, while after the expiration it will again be considered to be an unknown entity.

In response to determining that the social entity attempting to connect to or communicate with user 106 is a known entity, risk protection module 102 may identify the social risk score that is associated with the social entity, and may recommend or take appropriate security action based on a comparison of the social risk score to a social risk threshold.

A social risk score is a calculation of the security risk associated with a target URL, file, or social communication and thus, the risk posed by a scored social entity that is associated with the target. Social risk scores may be determined by the predictive risk protection module 103 of security analysis engine 101, which may proactively identify cyber threats, before attacks occur. The predictive risk protection module 103 may be driven by a scoring algorithm that can determine and score a risk posed by a dormant social entity by analyzing a target URL, file, or social communication that is associated with the social entity, prior to a user's engagement with the social entity. The social risk scores determined by the predictive protection module 103 may be associated with corresponding URLs in entries that are generated by security analysis engine 101, and that are stored in social risk database 104.

A variety of analytical factors can be used by the scoring algorithm to analyze a target URL, file, or social communication, where each factor employed by the algorithm is associated with one or more characteristics of the target and/or the social entity associated with the target. The characteristics of the target and/or social entity that may be analyzed by the scoring algorithm include contextual, lexical, visual, audio, profile, URL, file, network, destination content, domain, host, and application characteristics. The algorithm may analyze, for example, content of a resource that is referenced by a target URL, such as a social network profile of the social entity that is referenced by the target. The algorithm may analyze the content or function of a target file, and/or the type, size, or attributes of the target file.

The algorithm may dynamically determine which factors to employ in analyzing a target URL, file, or social communication. The algorithm may, for example, assign a confidence level to a social risk score that is determined based on a first set of factors and, if the confidence level falls below a confidence threshold, the algorithm may refine the social risk score based on one or more additional sets of factors, until the confidence level assigned to the social risk score meets or exceeds the confidence threshold.

A social risk threshold represents a level of tolerance for risk, and a particular social risk threshold may be associated with a particular user, organization or entity. Security analysis engine 101 may assign a social risk threshold to a user, organization, or entity based on, for example, input from the user, or one or more characteristics of the user, user's social network activity, and/or a collection of users associated with the organization or entity.

When the risk protection module 102 determines that the social entity attempting to connect to, to follow, or communicate with user 106 is a known entity, the risk protection module 102 may identify the social risk score that is associated with the social entity based on entry in social risk database 104, and may recommend or take appropriate security action based on a comparison of the social risk score to the user 106's social risk threshold. The risk protection module 102 may, for example, alert the user to the potential risk posed by the social entity, and/or block the social entity's communication or connection attempt. In another example, the risk protection module may recommend to monitor the social entity associated with the potential risk.

When, on the other hand, the risk protection module 102 determines that the social entity attempting to connect to or communicate with user 106 is an unknown entity, the risk protection module 102 may use the scoring algorithm to generate a social risk score for the unknown entity, and may store the generated social risk score in a new entry in the social risk database 104, the new entry including the URL associated with the unknown entity and/or characteristics of the social entity or user. The risk protection module 102 may then recommend or take appropriate security action based on a comparison of the social risk score to the user 106's social risk threshold.

The predictive risk protection module 103 may, in addition to proactively determining social risk scores, alert the user 106 to risks posed by other social entities based on entries in social risk database 104. The predictive risk protection module 103 may, for example, alert the user 106 to risks posed by social entities with which user 106 has had no contact. For example, the risk protection module 103 may identify a connection between user 106 and known social entity 108, in addition to a connection between known social entity 108 and another social entity in social network 105. An entry in social risk database 104 may indicate that the social risk score for known social entity 108 falls below user 106's social risk threshold, but another entry may indicate that the social risk score associated with the social entity with which user 106 has had no contact exceeds user 106's social risk threshold. In cases like this, the predictive risk protection module 103 may, based on a comparison between a social entity's social risk score and a user's social risk threshold, initiate a security action relating to the social entity, even before the social entity attempts to connect to or communicate with the user.

The phishing engine 110 may be implemented as part of the security analysis engine 101 or on a separate system that is in communication with the security analysis engine 101 over a network. The phishing engine may be used to assess the vulnerability of a protected social entity to phishing attempts. In more detail, the phishing engine 110 may launch benign links to track whether or not a protected social entity clicks on the launched link. The phishing engine 110 may also determine the likelihood that a protected social entity may select a hyperlink based on one or more other social entities selecting hyperlinks.

Figure 2:
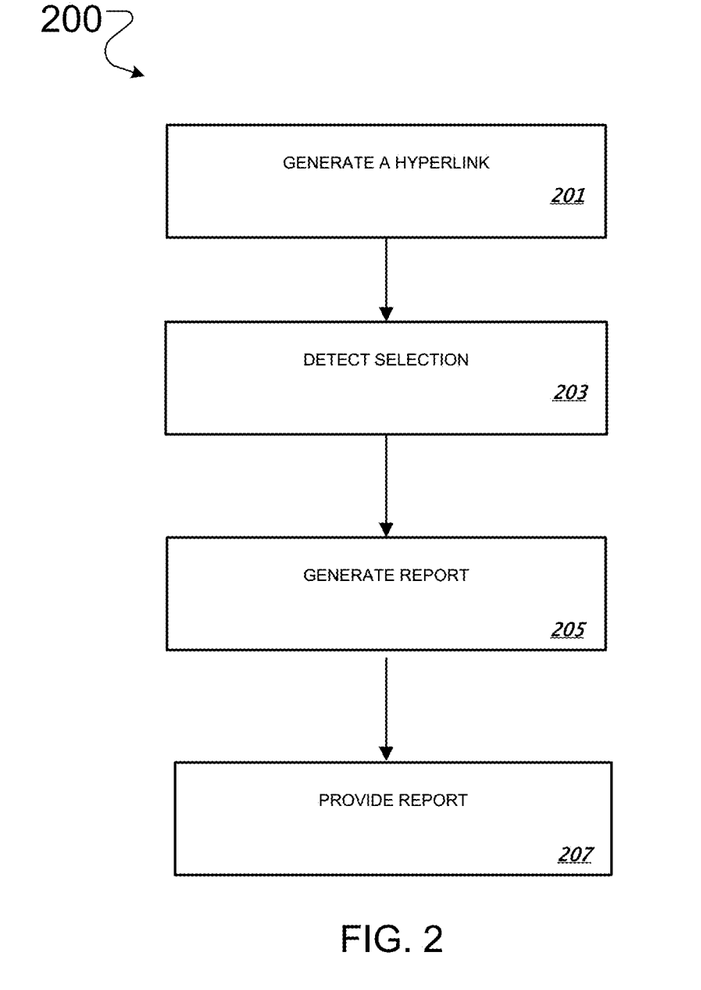
FIG. 2 is a flowchart of an example of a process for providing a generated report to a user associated with a protected social entity.

FIG. 2 is a flowchart of a process 200 for generating a report, and providing the generated report to a user associated with a protected social entity. The process 200 may be implemented, for example, using system 100, although other systems or configurations may be used. In such an implementation, one or more parts of the process may be executed by security analysis engine 101, which may interface with other computers through a network. Security analysis engine 101 may retrieve data involved in the process, such as data used in assessing a security risk posed by a social entity, from one or more local or remote data sources, such as social risk database 104 and user 106. Phishing engine 110 may be implemented on a same computer as the security analysis engine 101, and may work in conjunction with the security analysis engine to detect, and track the selection of specific hyperlinks across multiple networks.

Process 200 begins when the security analysis engine 101 generates a hyperlink that targets a specific Uniform Resource Locator (URL) (200). The hyperlink may be generated, for example, by the phishing engine 110 of the security analysis engine. The hyperlink may be generated by the phishing engine 110 automatically, and without any user initiation. In some implementations, a hyperlink may be automatically generated by the phishing engine 110 on a periodic basis. In these implementations, a user associated with a protected social entity may select a period for the generation of a hyperlink. For example, the user may select an option for the phishing engine to generate hyperlink once every quarter. In some implementations, a hyperlink may be generated automatically when the security analysis engine detects a security threat associated with one or more social entities across multiple social networks. In some implementations, where a hyperlink is generated on a periodic basis, the generated hyperlink is different from other one or more hyperlinks generated in the past by the phishing engine 110.

The generated hyperlink may target a specific URL that is unique to the hyperlink. In some implementations, each of the one or more hyperlinks generated by the phishing engine 110 may target the same URL. The text of the hyperlink may include a hashtag. For example, the generated hyperlink may be "#Acme." The URL targeted by the generated hyperlink may provide fictitious information to an entity that selects the hyperlink. The generated hyperlink may be a "benign" link that does not provide the entity that selects the link with any information. The "benign" link may be a link to a page that records when a social entity clicks on the link. The page may record the event by time stamping the time of the selection of the hyperlink. In some examples, the URL targeted by the generated hyperlink may solicit information from a social entity that clicks on the link. For example, the resource targeted by the generated link may request the social entity's demographic information, such as name and address, internet protocol (IP) address, and geolocation.

The phishing engine 110 may detect a selection of the generated hyperlink by one or more social entities across one or more social networks (203). The generated hyperlink may target a resource that records when a social entity selects the hyperlink. The resource may be a blank page that time stamps the time a social entity selects the hyperlink. The time stamp information may be recorded, and stored in memory at the phishing engine 110. The phishing engine 110 may detect the selection of the hyperlink by social entities across the multiple different social network platforms. For example, the phishing engine 110 may detect that three hundred social entities on Facebook, forty-five social entities on LinkedIn, and two hundred and eighty social entities on Twitter selected a generated hyperlink. In some examples, the resource targeted by the hyperlink may solicit information from a social entity that selects the hyperlink. The phishing engine 110 may record, and store the one or more instances when a social entity provides information in response to a resource soliciting information from a social entity. For example, the phishing engine 110 may time stamp the time a social entity begins to type information into a field on the resource page. The phishing engine 110 may record an entity as providing information when the entity has provided some of the solicited information.

After detecting a selection of the generated hyperlink, the phishing engine 110 generates a report (205). The generated report may include analytical details regarding the selection of the generated hyperlink by the one or more social entities. The phishing engine 110 may collect, store, and analyze data associated with the detection of the selection of generated hyperlinks by one or more social entities across multiple social networks. The phishing engine 110 may determine a vulnerability rating for a protected social entity. In some implementations, where the protected social entity is a corporation, the phishing engine 110 may calculate a vulnerability score for the corporation. The vulnerability score may assess the probability that an entity that is associated with the protected corporation, will select a hyperlink. For example, the phishing engine may assess the probability that an employee of Acme would select a hyperlink posted to a social network profile of the employee.

The phishing engine then provides the generated report to a user associated with a protected social entity (207). The report may be provided to an authorized user of a protected social entity account through a vulnerability management platform. The protected social entity may be an organization, such as, a corporation. In these instances, the authorized user may be a security personnel at the information technology (IT) department at the organization. In some implementations, the report may be provided as a portable document format (PDF) file. In these implementations, the report may be provided as a downloadable PDF file. In some implementations, the report may be provided as a text file to the authorized user. The report may be provided to the authorized user as a dynamic report that is displayed when the user logs into the vulnerability management platform. In these implementations, the report may include one or more graphical illustrations of the vulnerability data.

Figure 3:
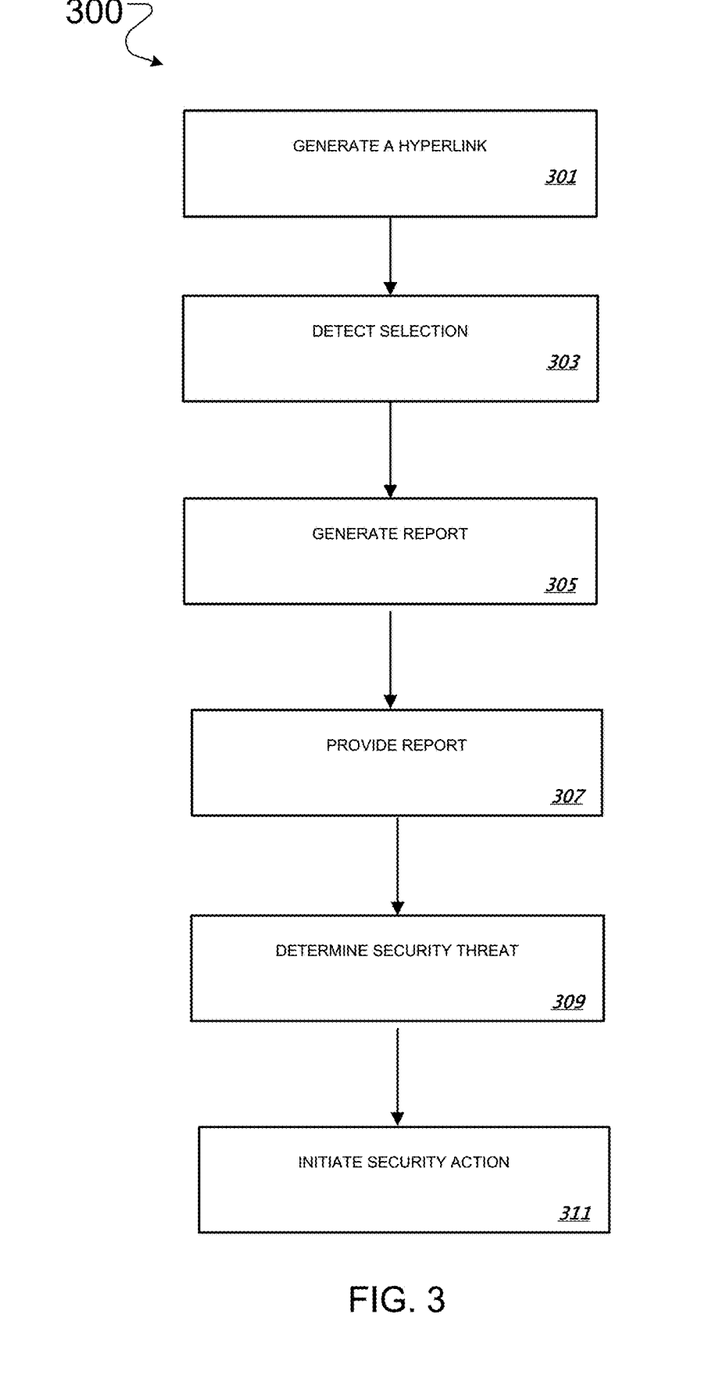
FIG. 3 is a flowchart of an example process for providing a report, and for initiating a security action.

FIG. 3 is a flowchart of a process 300 for initiating a security action based on a generated report. The process 300 may be implemented, for example, using system 100, although other systems or configurations may be used. In such an implementation, one or more parts of the process may be executed by security analysis engine 101, which may interface with other computers through a network. Security analysis engine 101 may retrieve data involved in the process, such as data used in assessing a security risk posed by a social entity, from one or more local or remote data sources, such as social risk database 104 and user 106. Phishing engine 110 may be implemented on a same computer as the security analysis engine 101, and may work in conjunction with the security analysis engine to detect and track the selection of specific hyperlinks across multiple networks.

Process 300 begins when the security analysis engine 101 generates a hyperlink that targets a specific Uniform Resource Locator (URL) (301). The hyperlink may be generated, for example, by the phishing engine 110 of the security analysis engine. The hyperlink may be generated by the phishing engine automatically, and without any user initiation. In some implementations, a hyperlink may be automatically generated by the phishing engine 110 on a periodic basis. In these implementations, a user associated with a protected social entity may select a period for the generation of a hyperlink. For example, the user may select an option for the phishing engine to generate hyperlink once every quarter. In some implementations, a hyperlink may be generated automatically when the security analysis engine detects a security threat associated with one or more social entities across multiple social networks. In some implementations, where a hyperlink is generated on a periodic basis, the generated hyperlink is different than other one or more hyperlinks generated in the past by the phishing engine 110.

The generated hyperlink may target a specific URL that is unique to the hyperlink. In some implementations, each of the one or more hyperlinks generated by the phishing engine may target the same URL. The text of the hyperlink may include a hashtag. For example, the generated hyperlink may be "#Acme." The URL targeted by the generated hyperlink may provide fictitious information to an entity that selects the hyperlink. The generated hyperlink may be a "benign" link that does not provide the entity that selects the link with any information. The "benign" link may be a link to a page that records when a social entity clicks on the link. The page may record the event by time stamping the time of the selection of the hyperlink. In some examples, the URL targeted by the generated hyperlink may solicit information from a social entity that clicks on the link. For example, the resource targeted by the generated link may request the social entity's demographic information, such as name and address.

The phishing engine 110 may detect a selection of the generated hyperlink by one or more social entities across one or more social networks (303). The generated hyperlink may target a resource that records when a social entity selects the hyperlink. The resource may be a blank page that time stamps the time a social entity selects the hyperlink. The time stamp information may be recorded, and stored in memory at the phishing engine 110. The phishing engine 110 may detect the selection of the hyperlink by social entities across the multiple different social network platforms. For example, the phishing engine may detect that 300 social entities on Facebook, 3 social entities on LinkedIn, and 450 social entities on Twitter selected a generated hyperlink. In some examples, the resource targeted by the hyperlink may solicit information from a social entity that selects the hyperlink. The phishing engine 110 may record, and store the one or more instances when a social entity provides information in response to a resource soliciting information from a social entity. For example, the phishing engine 110 may time stamp the time a social entity begins to type information into a field on the resource page. The phishing engine 110 may record an entity as providing information when the entity has provided some of the solicited information.

After detecting as selection of the generated hyperlink, the phishing engine 110 generates a report (305). The generated report may include analytical details regarding the selection of the generated hyperlink by the one or more social entities. The phishing engine 110 may collect, store, and analyze data associated with the detection of the selection of generated hyperlinks by one or more social entities across multiple social networks. The phishing engine 110 may determine a vulnerability rating for a protected social entity. In some implementations, where the protected social entity is a corporation, the phishing engine 110 may calculate a vulnerability score for the corporation. The vulnerability score may assess the probability that an entity that is associated with the protected corporation, will select a hyperlink. For example, the phishing engine may assess the probability that an employee of Acme would select a hyperlink posted to a social network profile of the employee.

The generated report may also include a number of social entities that are attempting to impersonate the protected social entity. In some implementations, where the protected social entity is a corporation, the generated report may include the number of social entities that are attempting to impersonate employees of the corporation. For example, the generated report may include the number of impersonates of the CEO, the CFO, and other employees of the corporation. The security analysis engine 101 may scan the protected social entity's profile on a social network for identifying information that may be unique to the protected social entity. The security analysis engine 101 may, for example, scan the protected entity's profile page for data including a profile picture, name, date of birth, place of employment, education, and location, etc. The security analysis engine 101 may then continuously scan, without user initiation, one or more social networks to identify social entities that may be impersonating the protected social entity. The security analysis engine 101 may identify an impersonating social entity by assessing how similar data that is associated with a suspect social entity is to the data that is associated with the protected social entity.

A protected social entity may be an individual who seeks protection from the vulnerability management platform. Jane Roe, for example, may seek to protect her personal account from suspect social entities who may attempt to use her personal information to generate one or more fraudulent accounts on social media websites. In some examples, a protected social entity may be an enterprise or a company, Acme Inc., for example, may be a social entity that seeks to protect its corporate profiles on social websites, and to monitor other social entities on social websites that claim to be employed or otherwise affiliated with Acme, Inc.

A suspect social entity may generate and maintain fraudulent profiles that impersonate accounts of other social entities on social media websites. A fraudulent profile may be generated and maintained by an individual. For example, John Doe may impersonate Jane Roe by generating a fake profile page for Jane Roe on LinkedIn, using an image of Jane obtained from the Internet, unbeknownst to Jane Roe herself. In other examples, one or more a fraudulent profiles may be generated and maintained by a malicious bot on a social media website. A suspect social entity may be a social entity that is potentially associated with a fraudulent social network profile or account. A suspect social entity may also be a social entity that potentially falsely claims to be affiliated with an enterprise or association. John Doe, for example, may falsely list ZeroFOX as an employer. A suspect social entity may generate an imposter profile of a protected social entity on a social network. The imposter profile may include the exact information from the real profile page of the protected social entity. For example, the imposter profile may include the protected social entity's profile picture, date of birth, location, place of employment and any other additional profile information.

In some implementations, an imposter profile may not post any malicious malware on behalf of the protected social entity. In these implementations, imposter may simply impersonate the protected entity and continuously connect with more and more followers of the genuine protected social entity. The imposter may launch malicious attacks once it has been wrongly been identified as a "trusted" profile.

The security analysis engine 101 may be configured to take security actions in response to the identification of a fraudulent profile. Security analysis engine 101 may, for example, flag identified fraudulent profiles that have been generated to impersonate the profile of a protected social entity. In some implementations, the user analysis engine 109 may flag the identified fraudulent profiles. The flagged fraudulent profiles may also be monitored to identify any malicious actions. A fraudulent profile may, for example, be maintained on a "watch list" of social media profiles that should be monitored for malicious acts. The fraudulent profile may be an imposter of a protected social entity. The imposter may or may not post malicious content on behalf of the protected security. The security analysis engine may identity any imposters of the protected social entity. A protected social entity may be alerted to posts or other actions carried out by suspect social entities that have been identified as impersonators of the protected social entity. For example, if malware is posted to a fraudulent LinkedIn page run by a social entity that is impersonating Jane Roe, Jane may be alerted of the action. Similarly, if Acme, Inc. is a protected social entity, Acme, Inc. may receive alerts if a fraudulent profile distributes malware in the company's name.

In more detail, a scanner identifies data on one or more social networks that is associated with a suspect social entity. The scanner may be hosted at an entity that is different and separate from the security analysis engine 101. Alternatively, the scanner may be part of, or otherwise associated with, the security analysis engine 101, and may be integrated into the system 100 illustrated in FIG. 1.

Security analysis engine 101 may continuously, and without user initiation scan social networks for publicly available information, and/or information that is available to security analysis engine 101 by special authorization. The type of data that is scanned from social networks may vary depending on the social network. For some social networks, security analysis engine 101 may only have access to publicly available information, in which case the scan of the social network would be limited to identifying and/or acquiring this publicly available data. Other social networks may instead recognize security analysis engine 101 as an authorized user (or as otherwise having an elevated security status), and may therefore provide security analysis engine 101 with access to additional information that is not available to the general public.

The security analysis engine 101 may determine one or more characteristics of identified data. Characteristics that may be determined for the identified data may vary depending on the type of data identified. Identified data that is associated with a suspect social entity may include, for example, the suspect social entity's user name, profile picture, date of birth, gender, location, email address, education, and organization. The identified data associated with the suspect social entity may also include data about the friends, followers or connections of the suspect social entity. In some implementations, the security analysis engine may determine a rating for the friends or followers of a suspect entity. In these implementations, the profile score of the social entity may be affected by the rating determined for the friends or followers of the social entity. For example, the security analysis may rate the friends or followers of an entity as high risk, based on a large number of the friends or following being associated with malicious acts.

Following a determination of the characteristics of the identified data, security analysis engine 101 may generate, for each of the one or more characteristics, a reference to the characteristic or to the identified data to which the characteristic pertains. Security analysis engine 101 may, for instance, create a reference to a characteristic by tagging the characteristic. The characteristic may be tagged, for example, with a keyword or term that describes the characteristic.

References to characteristics of identified data that is associated with a protected social entity may be generated when the security analysis engine 101 scans social websites. The security analysis engine 101 may scan a protected social entity's profile, for example, for data including the protected social entity's user name, profile picture, date of birth, gender, location, email address, education, and organization. In some examples, the protected social entity may provide additional images other than the entity's current profile picture. In these examples, the security analysis engine 101 may store a reference to the additional images. When the protected social entity is a popular individual or celebrity, the security analysis engine 101 may acquire additional images from websites such as Wikipedia, and store references to these images. In some other examples, the protected social entity may be an enterprise or company that seeks to protect the use of an emblem or logo that is associated with the enterprise or company. The security analysis engine 101 may, in these examples, store references to images that are associated with the company.

The security analysis engine 101 may store the references to the identified data in a database. Storage of references to identified data rather than the identified data itself may minimize the amount of memory needed to assess and to act on risks posed by social entities. In some implementations, however, both references to identified data and the identified data itself may be stored. In some implementations, all references to the one or more characteristics of the identified data associated with the protected social entity are stored while, in others, only a select group of references are stored.

The security analysis engine 101 may compare one or more generated references to one or more stored references. The security analysis engine 101 may store one or more references to characteristics of identified data associated with a protected social entity.

The security analysis engine 101 may use one or more techniques to compare generated references to identified data that is associated with a suspect social entity, to stored references to identified data that is associated with a protected social entity. The security analysis engine may compare images obtained from websites such as Wikipedia to compare to the image of the suspect social entity. The security analysis engine 101 may derive data from an image by hashing the image. The security analysis engine 101 may, for example, generate a reference to an image that is associated with a suspect social entity by hashing the image, and may compare the hashed image with a hash of an image that is associated with a protected social entity. Through this method or by other techniques, the security analysis engine 101 may be able to detect if an image associated with a protected social entity is being used by a suspect social entity. The security analysis engine 101 may also use facial recognition to identify individuals in images and to generate references. The facial recognition process that is executed on images can be used to recognize various characteristics of individuals in the images, including facial structure or gender.

In some implementations, the security analysis engine 101 may determine a match score for each comparison that occurs between references to characteristics associated with the protected social entity and references to characteristics associated with the suspect social entity. The security analysis engine 101 may then determine an overall profile score of a suspect social entity based on an average of the match scores of each comparison. The security analysis engine 101 may, for example, determine a match score based on a comparison of references to a name field of a protected social entity and one or more suspect social entities. The security analysis engine 101 may determine a high match score for suspect entities that have variations of the name of the protected social entity. For example, suspect entities Mike Hall, Micky Hall, Mic Hall, Mik Hall, Mick Hall and M Hall may be assigned a high match score for the protected social entity Michael Hall.

The security analysis engine 101 may also compare a reference to a location of a protected social entity to a reference of the location of a suspect entity. In some implementations, the location of a suspect social entity may be identified from demographic information listed on the profile page of the suspect social entity.

Following comparison of references, the security analysis engine 101 may determine a profile score of the suspected social entity. The profile score is a quantifiable rating that measures how closely a suspect social entity matches a protected social entity. In some implementations, the security analysis engine 101 may calculate a match score for each reference that is compared between the protected social entity and the suspect social entity. In these implementations, the profile score may be determined as the average of the match scores. In other implementations, the profile score may be determined using a different algorithm. The profile score may, for example, be determined as a weighted average of a comparison of the references between the protected social entity and the suspect social entity. A comparison of a reference to an image, for instance, may be more heavily weighted than that of a reference to the location, which may in turn be more heavily weighted than a reference to a date of birth. In some implementations, the generated report may include the list of the determined impersonators. In other implementations, the generated report may include the number of impersonators detected.

The phishing engine then provides the generated report to a user associated with a protected social entity (307). The report may be provided to an authorized user of a protected social entity account through a vulnerability management platform. The protected social entity may be an organization, such as, a corporation. In these instances, the authorized user may be a user at the information technology (IT) department at the organization. In some implementations, the report may be provided as a portable document format (PDF) file. In these implementations, the report may be provided as a downloadable PDF file. In some implementations, the report may be provided as a text file to the authorized user. The report may be provided to the authorized user as a dynamic report that is displayed when the user logs into the vulnerability management platform. In these implementations, the report may include one or more graphical illustrations of the vulnerability data.

The phishing engine 110 may determine a security threat (309). The phishing engine 110 may determine a security threat if the assessed vulnerability score included in the generated report is above a predetermined threshold. An authorized user associated with a protected social entity may have the ability to configure one or more threshold security settings associated with the vulnerability management platform. The user may set a threshold for the vulnerability score that triggers a security threat. For example, the authorized user may set a vulnerability score threshold at 7. The authorized user associated with the protected social entity may have the ability to set a threshold for the number of impersonators that trigger a security threat. For example, the user may set the number of impersonators that trigger a security threat at fifty. The security analysis engine in conjunction with the phishing engine 110 may determine a security threat when the number of identified impersonators of the protected social entity exceeds fifty.

The phishing engine 110 may then initiate a security action (311). The phishing engine 110 may initiate a security action based on determining a security threat. In some implementations, initiating a security action may include generating an alert, and providing the generated alert to the protected social entity. In some implementations, the alert may be a web-based alert. The alert may also be received as an email, or as a text message on a mobile device of the protected social entity. In other implementations, the protected social entity may be provided with visual alerts through the vulnerability management platform. In some implementations, where the protected social entity is an organization, the authorized user associated with the protected social entity may receive the alerts.

FIGS. 4, 5, 6, 7, and 8 are example illustrations of a vulnerability management platform. The illustrated user interfaces may be displayed, for example, when an administrator of a vulnerability management platform logs into the platform.

Figure 4:
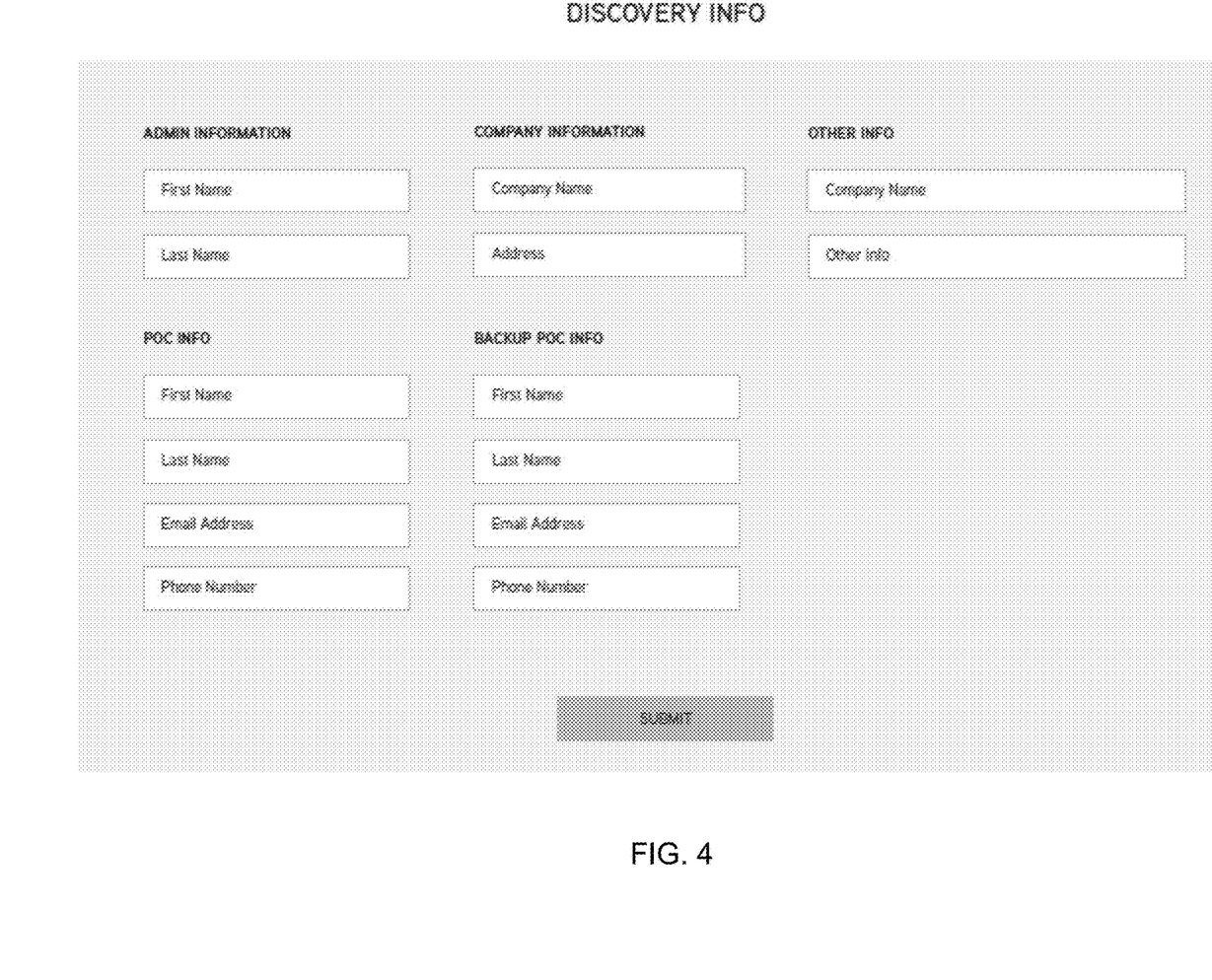
FIGS. 4-8 are illustrations of a vulnerability management platform.

As FIG. 4 illustrates, the vulnerability management platform may have one or more fields enabling an authorized user associated with a protected social entity to register with the service provided by the management platform. FIG. 4 illustrates, for example, account generation. The authorized user associated with the account may be required to provide his or her name and company information. In some implementations, where the protected social entity is an organization, the authorized user may provide information for a point of contact, and a secondary point of contact.

Figure 5:
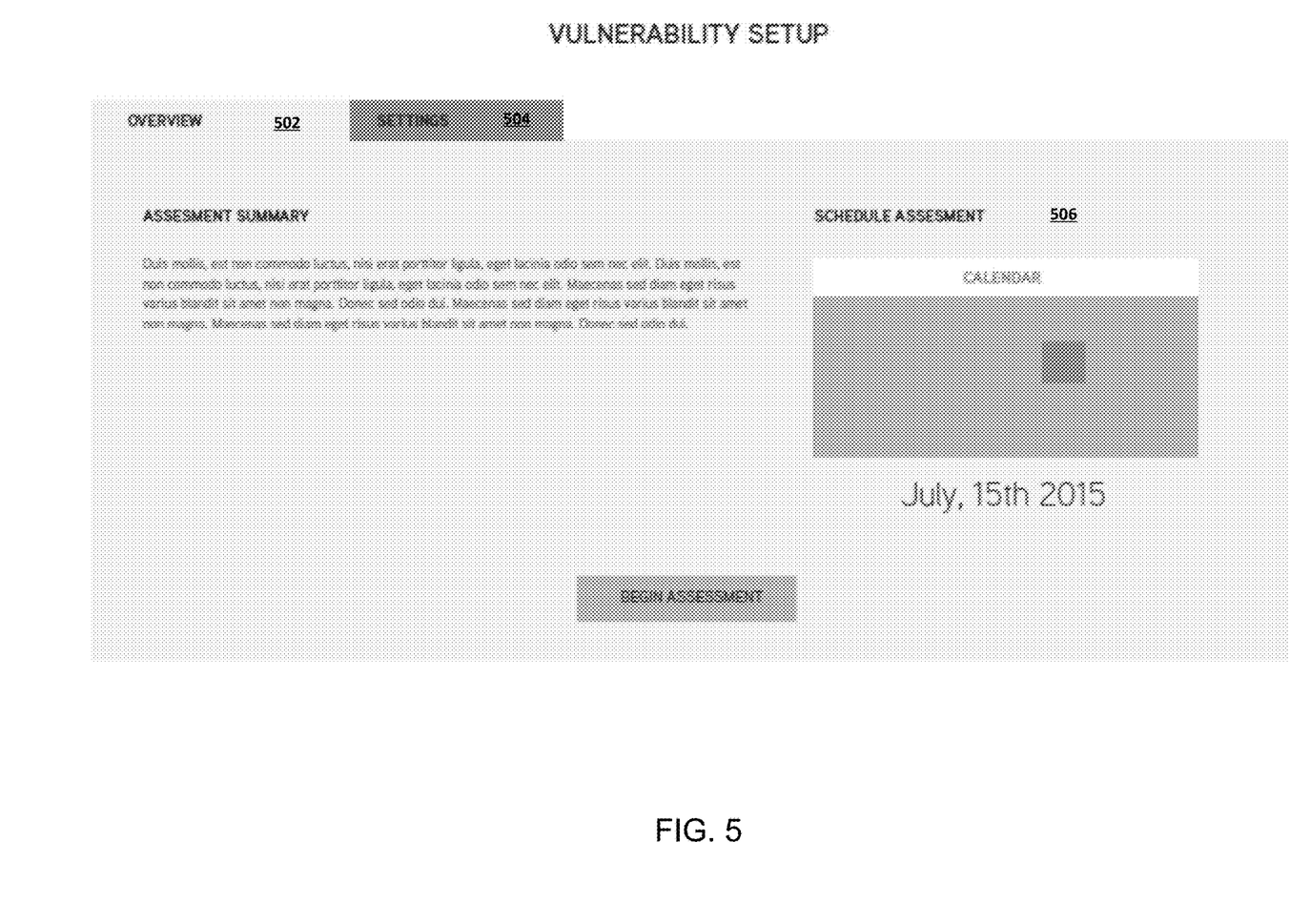

FIG. 5 illustrates that a user may select an overview tab 502, and a schedule assessment tab 506 to schedule a specific date for the vulnerability management platform to perform a vulnerability assessment. In some implementations, the user may select a period for the phishing engine 110 to generate the hyperlink. For example, the user may select to generate a hyperlink once a month. The user may also select the settings tab 504. When selected, the user may have the ability to set one or more security settings. For example, the user may have the ability to set the vulnerability score threshold, and the user may have the ability to set the threshold for the number of detected impersonators that trigger a security action. The user may also have the ability to select his/her preference for receiving generated reports. For example, the user may select to receive web-based reports. In some other examples, the user may select to receive downloadable PDF reports.

Figure 6:
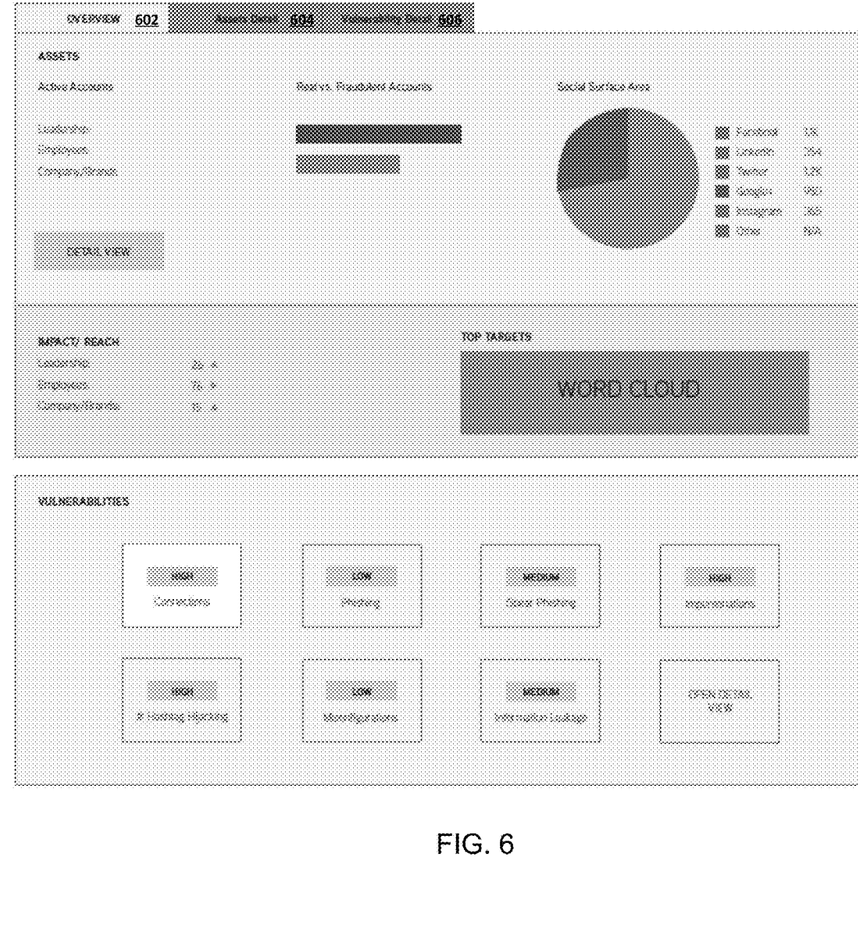

FIG. 6 illustrates an example web-based report. The overview 602 of the generated report may include a graph that illustrates the one or more assets of the protected social entity. For the example illustrated, where the protected social entity is an organization, the generated report may show the number of active social accounts associated with the protected social entity. The report may also include the number of leadership employees, for example executive board members, and the number of employees. The report may include the one or more multiple social networks scanned by the security analysis engine. For example, the report may include a pie chart that illustrates the relative number of social entities on each of the one or more scanned social networks. The report may include one or more vulnerability assessments. For the example illustrated in FIG. 6, the generated report may include a connections assessment, a phishing assessment, hashtag hijacking assessment, a spear phishing assessment, a misconfigurations assessment, an information leakage assessment, and an impersonation assessment. In some implementations, the generated report may include one vulnerability score that is determined by determining a weighted average of the one or more vulnerability assessments ratings.

Figure 7:
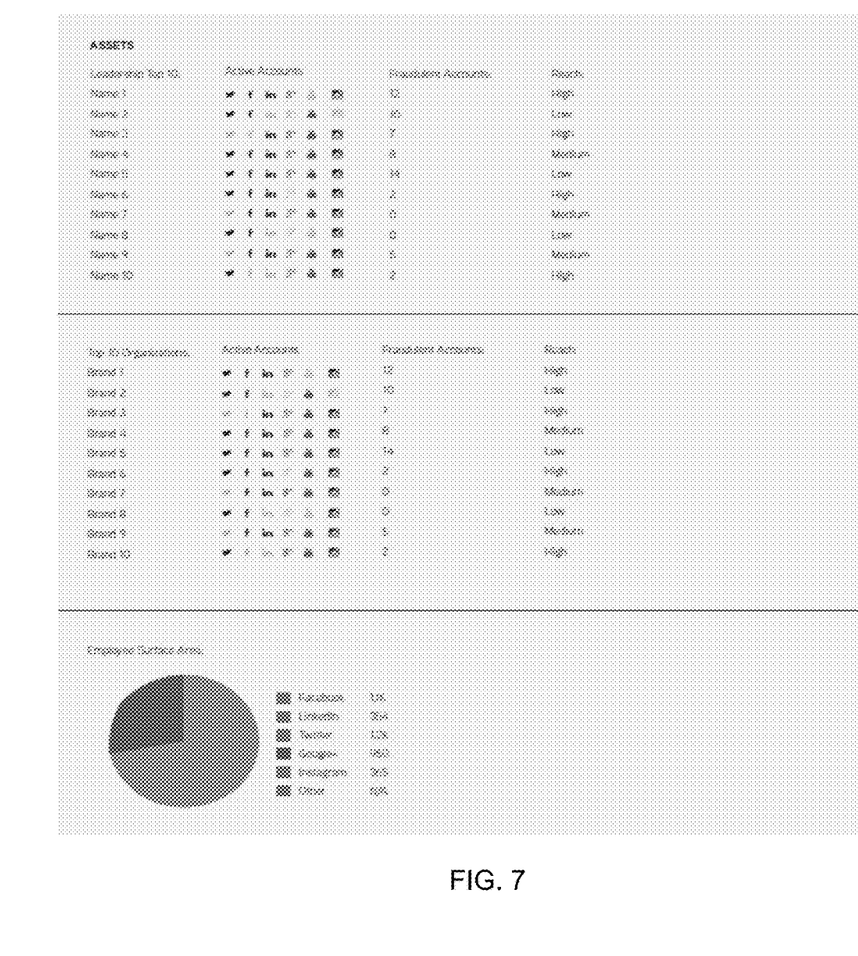

FIG. 7 illustrates a result of a user selection of the assets detail tab 604 depicted in FIG. 6. When selected, the vulnerability management platform may list the details for the one or more employees at the protected organization. The asset details may include the one or more social network that each employee has an active account. The details may also include the number of fraudulent accounts identified for each employee. The details may also include a vulnerability rating for each of the one or more employees based on the social network accounts assessed. For the example, the detail may include Employee A and indicate that Employee A has a high vulnerability rating.

Figure 8:
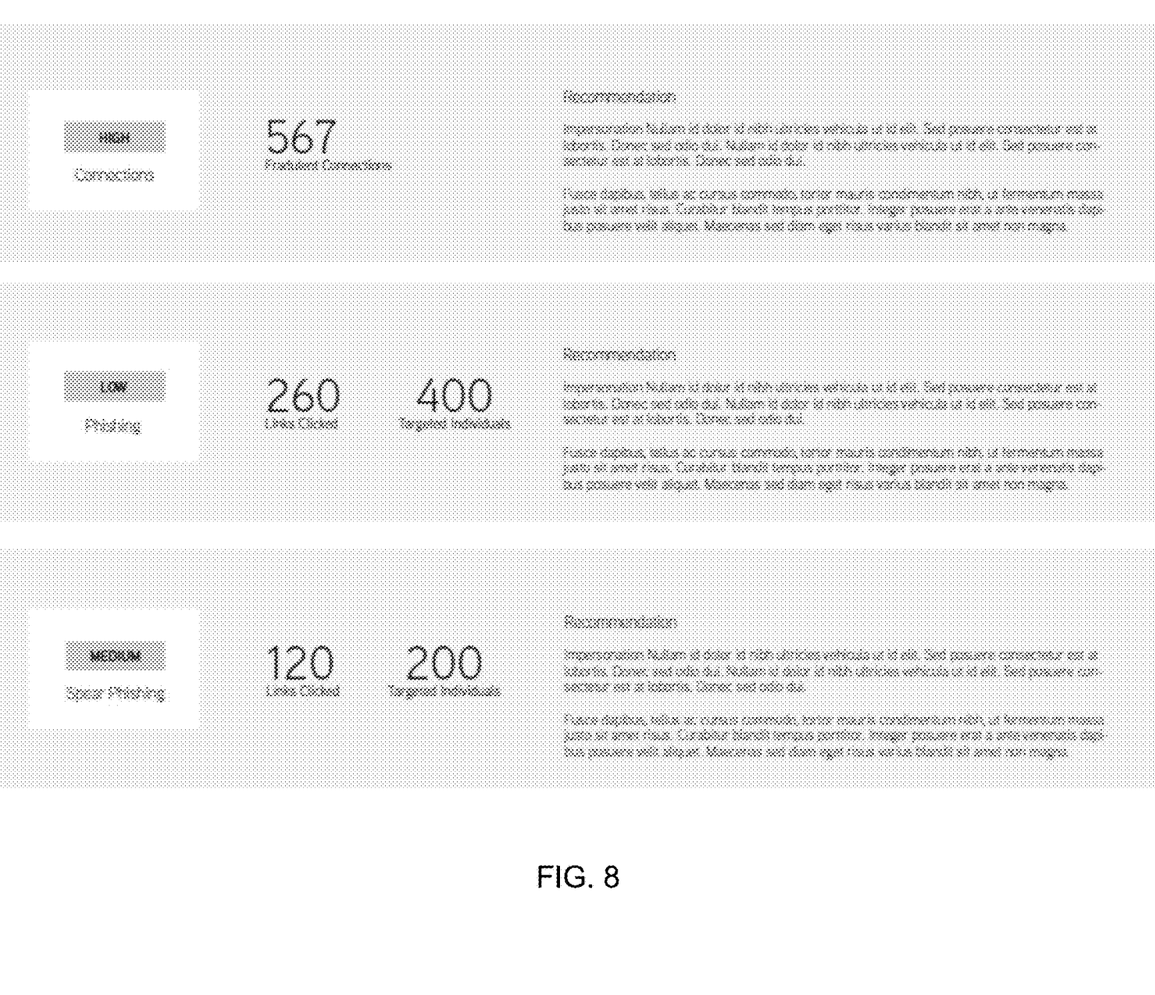

FIG. 8 illustrates a result of user selection of the vulnerability detail tab 606 as depicted in FIG. 6. When selected, the vulnerability management platform may display one or more recommendation actions for each of the vulnerability assessments. For the example illustrated in FIG. 8, the vulnerability management platform indicates a high vulnerability rating for the impersonation field, and further includes the number of identified impersonators and the number of individuals targeted.

A number of implementations have been described. Nevertheless, it will be understood that various modifications may be made without departing from the spirit and scope of the disclosure.

In addition, logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

What is claimed is:

1. A computer-implemented method comprising:
generating, by a phishing engine of a vulnerability management platform, a hyperlink targeting a Uniform Resource Locator (URL);
communicating, by the phishing engine, the generated hyperlink to one or more social entities;
detecting, by the phishing engine, a selection of the generated hyperlink by a subset of the one or more social entities across one or more social networks;
generating, by a report generator, a report that includes analytical details regarding the selection of the generated hyperlink by the subset of the one or more social entities;
determining, by the phishing engine, a vulnerability score for a protected social entity, that reflects a probability of the protected social entity selecting the generated hyperlink, wherein the vulnerability score for the protected social entity is a weighted average of one or more vulnerability assessment ratings;
comparing the vulnerability score for the protected social entity to a vulnerability threshold;
based on comparing the vulnerability score to the vulnerability threshold, determining that the vulnerability score exceeds the vulnerability threshold;
based on determining that the vulnerability score exceeds the threshold, generating an alert; and
providing, by the phishing engine, for output through the vulnerability management platform, the alert to a user associated with the protected social entity;
wherein the vulnerability management platform further comprises:
a security analysis engine configured to identify profiles that have been generated to impersonate the profile of the protected social entity;
a predictive risk protection module configured to proactively identify cyber threats by determining a social risk score for social entities before they attempt to connect with the user associated with the protected social entity; and
an active risk protection module configured to:
identify immediate security risks by determining a social risk score for unknown social entities that attempt to connect with the user associated with the protected social entity; and
initiate a security action based on the social risk score.

2. The method of claim 1 further comprising scanning data that is maintained on the one or more social networks, wherein scanning data that is maintained on the one or more social networks comprises identifying, by one or more processors, data that is associated with the one or more social entities.

3. The method of claim 2 wherein scanning data that is maintained on the one or more social networks is performed on a continuous basis, without user initiation.

4. The method of claim 2 wherein the selection of the generated hyperlink by the subset of the one or more social entities is detected during scanning.

5. The method of claim 1 wherein the text of the hyperlink is associated with a hashtag.

6. The method of claim 1 wherein, the protected social entity is an organization.

7. The method of claim 1 wherein the protected social entity is an individual.

8. The method of claim 1 wherein the resource targeted by the generated hyperlink provides fictitious information.

9. The method of claim 1 wherein the resource targeted by the generated hyperlink solicits information from the one or more social entities.

10. The method of claim 1 wherein the resource targeted by the generated URL indicates that it is related to a trusted social entity.

11. A system comprising:
one or more processing devices; and
one or more non-transitory computer-readable media coupled to the one or more processing devices having instructions stored thereon which, when executed by the one or more processing devices, cause the one or more processing devices to perform operations comprising: generating, by a phishing engine, a hyperlink targeting a Uniform Resource Locator (URL);
communicating, by the phishing engine of a vulnerability management platform, the generated hyperlink to one or more social entities;
detecting, by the phishing engine, a selection of the generated hyperlink by a subset of the one or more social entities across one or more social networks;
generating, by a report generator, a report that includes analytical details regarding the selection of the generated hyperlink by the subset of the one or more social entities;
determining, by the phishing engine, a vulnerability score for a protected social entity, that reflects a probability of the protected social entity selecting the generated hyperlink, wherein the vulnerability score for the protected social entity is a weighted average of one or more vulnerability assessment ratings;
comparing the vulnerability score for the protected social entity to a vulnerability threshold;
based on comparing the vulnerability score to the vulnerability threshold, determining that the vulnerability score exceeds the vulnerability threshold;
based on determining that the vulnerability score exceeds the threshold, generating an alert; and
providing, by the phishing engine, for output through the vulnerability management platform, the alert to a user associated with the protected social entity;
wherein the vulnerability management platform further comprises:
a security analysis engine configured to identify profiles that have been generated to impersonate the profile of the protected social entity;

a predictive risk protection module configured to proactively identify cyber threats by determining a social risk score for social entities before they attempt to connect with the user associated with the protected social entity; and an active risk protection module configured to:
- identify immediate security risks by determining a social risk score for unknown social entities that attempt to connect with the user associated with the protected social entity, and
- initiate a security action based on the social risk score.

12. The system of claim 11 further comprising scanning data that is maintained on one or more social networks, wherein scanning data that is maintained on one or more social networks comprises identifying, by one or more processors, data that is associated with the one or more social entities.

13. The system of claim 12 wherein scanning data that is maintained on the one or more social networks is performed on a continuous basis, without user initiation.

14. The system of claim 12 wherein the selection of the generated hyperlink by the subset of the one or more social entities is detected during scanning.

15. A non-transitory computer-readable storage medium encoded with a computer program, the program comprising instructions that when executed by a data processing apparatus cause the data processing apparatus to perform operations comprising:

generating, by a phishing engine of a vulnerability management platform, a hyperlink targeting a Uniform Resource Locator (URL);

communicating, by the phishing engine, the generated hyperlink to one or more social entities;

detecting, by the phishing engine, a selection of the generated hyperlink by a subset of the one or more social entities across one or more social networks;

generating, by a report generator, a report that includes analytical details regarding the selection of the generated hyperlink by the subset of the one or more social entities;

determining, by the phishing engine, a vulnerability score for a protected social entity, that reflects a probability of the protected social entity selecting the generated hyperlink, wherein the vulnerability score for the protected social entity is a weighted average of one or more vulnerability assessment ratings;

comparing the vulnerability score for the protected social entity to a vulnerability threshold;

based on comparing the vulnerability score to the vulnerability threshold, determining that the vulnerability score exceeds the vulnerability threshold;

based on determining that the vulnerability score exceeds the threshold, generating an alert; and providing, by the phishing engine, for output through the vulnerability management platform, the alert to a user associated with the protected social entity;

wherein the vulnerability management platform further comprises:

a security analysis engine configured to identify profiles that have been generated to impersonate the profile of the protected social entity;

a predictive risk protection module configured to proactively identify cyber threats by determining a social risk score for social entities before they attempt to connect with the user associated with the protected social entity; and an active risk protection module configured to:
- identify immediate security risks by determining a social risk score for unknown social entities that attempt to connect with the user associated with the protected social entity, and
- initiate a security action based on the social risk score.

\* \* \* \* \*